United States Patent
Wollin et al.

(10) Patent No.: US 7,422,235 B2
(45) Date of Patent: Sep. 9, 2008

(54) AIR-BAG OCCUPANT PROTECTION DEVICE

(75) Inventors: Séverine Wollin, Shanghai (CN); Emma Svenbrant, Gothenburg (SE)

(73) Assignee: Autoliv Development AB, Vargarda (SE)

( * ) Notice: Subject to any disclaimer, the term of this patent is extended or adjusted under 35 U.S.C. 154(b) by 37 days.

(21) Appl. No.: 10/558,335

(22) PCT Filed: May 21, 2004

(86) PCT No.: PCT/SE2004/000779

§ 371 (c)(1),
(2), (4) Date: Sep. 21, 2006

(87) PCT Pub. No.: WO2004/106122

PCT Pub. Date: Dec. 9, 2004

(65) Prior Publication Data

US 2007/0152430 A1    Jul. 5, 2007

(30) Foreign Application Priority Data

May 27, 2003  (GB) .................................. 0312120.9

(51) Int. Cl.
*B60R 21/16* (2006.01)
(52) U.S. Cl. ............... 280/730.2; 280/743.1; 280/743.2
(58) Field of Classification Search ............ 280/730.1, 280/730.2, 743.1, 743.2, 740
See application file for complete search history.

(56) References Cited

U.S. PATENT DOCUMENTS

| 5,586,782 | A | * | 12/1996 | Zimmerman et al. ..... 280/730.2 |
| 5,853,191 | A | | 12/1998 | Lachat |
| 6,062,594 | A | * | 5/2000 | Asano et al. .............. 280/730.2 |
| 6,279,944 | B1 | * | 8/2001 | Wipasuramonton et al. ........................ 280/730.2 |
| 6,349,964 | B1 | * | 2/2002 | Acker et al. .............. 280/730.2 |
| 6,802,529 | B2 | * | 10/2004 | Takedomi et al. ........... 280/729 |
| 6,997,473 | B2 | * | 2/2006 | Tanase et al. ............. 280/730.2 |
| 7,021,652 | B2 | * | 4/2006 | Kumagai et al. ............. 280/729 |
| 7,063,350 | B2 | * | 6/2006 | Steimke et al. .............. 280/729 |
| 7,278,656 | B1 | * | 10/2007 | Kalandek ................. 280/730.2 |
| 2005/0161927 | A1 | * | 7/2005 | Yokoyama ............... 280/743.1 |
| 2007/0228701 | A1 | * | 10/2007 | Yamamura ............... 280/730.2 |

FOREIGN PATENT DOCUMENTS

| DE | 195 29 829 C1 | 10/1996 |
| DE | 198 50 448 A1 | 5/2000 |
| EP | 1 122 134 A1 | 8/2001 |
| JP | 2000-85515 | 3/2000 |
| JP | 2001-114060 | 4/2001 |

* cited by examiner

*Primary Examiner*—Toan C To
(74) *Attorney, Agent, or Firm*—Brinks Hofer Gilson & Lione

(57) ABSTRACT

An air-bag (1) having an inflatable region forming two chambers (3,4) divided by a seam (5). The seam extends towards a back part (6) of the air-bag. A gas generator unit (14,15) is located between the end of the seam (5) and the back part (6) of the air-bag. A strap (21) passes through an aperture (8) formed in a terminal part of the seam (5) to draw the terminal part of the seam to the gas generator unit (14,15) thus effectively sealing the two chambers (3,4). The chambers (3,4) may be inflated to different pressures.

11 Claims, 4 Drawing Sheets

AIR-BAG OCCUPANT PROTECTION DEVICE

CROSS REFERENCE TO RELATED APPLICATIONS

This application claims priority to Great Britain application number 0312120.9, filed May 27, 2003 and PCT/SE2004/000779, filed May 21, 2004.

FIELD OF THE INVENTION

THE PRESENT INVENTION relates to an air-bag and more particularly to an air-bag of the type in which an inflatable region of the air-bag is divided into a plurality of discrete chambers.

BACKGROUND OF THE INVENTION

Various types of air-bag have been proposed before in which an inflatable region of the air-bag is divided into two discrete chambers. One particular air-bag of this type is disclosed in U.S. Pat. No. 6,349,964. The air-bag disclosed by that patent is an air-bag which, when inflated, is intended to be located adjacent the side of the occupant of a seat within a motor vehicle, and the air-bag has a main inflatable region which is divided into an upper chamber and a lower chamber, by means of a substantially horizontal seam which extends from the front part of the air-bag towards the rear part of the air-bag. The chambers are to be inflated to different pressures and thus should be substantially sealed from each other.

In the embodiment described by the above-referenced patent, a gas generator and gas-deflector is inserted in position within the air-bag, fitting snugly between one end of the horizontal seam and the rear part of the air-bag. The gas-generator must, to provide the desired effect, make a substantially gas-tight seal with the innermost end of the horizontal seam. This may be extremely difficult to achieve, particularly if a gas-generator is utilised which has two projecting studs by means of which the gas-generator may be mounted in position within the vehicle. Gas-generators with such projecting studs are in widespread use.

SUMMARY OF THE INVENTION

The present invention seeks to provide an improved air-bag.

According to one aspect of this invention there is provided an air-bag, the air-bag having an inflatable region, the inflatable region being separated into two chambers by a seam which extends substantially across the air-bag, a space being left between the seam and a part of the air-bag to accommodate a gas-generator unit, the space being dimensioned sufficiently to enable the gas-generator unit to be inserted into the space, there being a strap associated with the seam to at least partially embrace the gas-generator unit and to draw a terminal part of the seam to the gas-generator unit.

Preferably, the gas-generator unit is a cylindrical unit provided with two protruding studs, the air-bag having two apertures to receive the studs.

Conveniently, the gas-generator unit incorporates a cylindrical gas-generator and a tubular gas-deflector, the gas-deflector having gas outlets at each end thereof and being positioned so that gas from one end of the gas-deflector will enter one chamber and gas from the other end of the gas-deflector will enter the other chamber.

Advantageously, a terminal part of the seam dividing the two chambers is provided with an aperture, the strap extending through the aperture and embracing the gas-generator unit.

In a modified embodiment of the present invention, the strap is secured to the air-bag and partially embraces the gas generator unit. The strap may be provided in the interior of the air-bag or, alternatively, may be provided on the exterior of the air-bag. Alternatively, the strap is formed of two strap parts, each strap part being secured to the air-bag, on a respective side of the air-bag, each strap part partially embracing the gas-generator unit. Conveniently, the strap or each strap part is secured to said seam. Advantageously, each strap part is provided with at least one aperture to be engaged with a protruding stud provided on the gas-generator.

Conveniently, the air-bag may incorporate at least one further chamber, each adjacent pair of chambers being separated by a respective seam, each seam having a respective strap associated with it.

According to another aspect of the present invention there is provided a method of fabricating an air-bag, the method comprising the steps of inserting a gas-generator unit into the air-bag, and tightening a strap which embraces the gas-generator unit to draw to the gas-generator unit one end of a seam that separates two chambers in an inflatable region of the air-bag.

BRIEF DESCRIPTION OF THE DRAWINGS

In order that the invention may be more readily understood, and so that further features thereof may be appreciated, the invention will now be described, by way of example, with reference to the accompanying drawings in which.

DETAILED DESCRIPTION OF THE INVENTION

Figure 1:
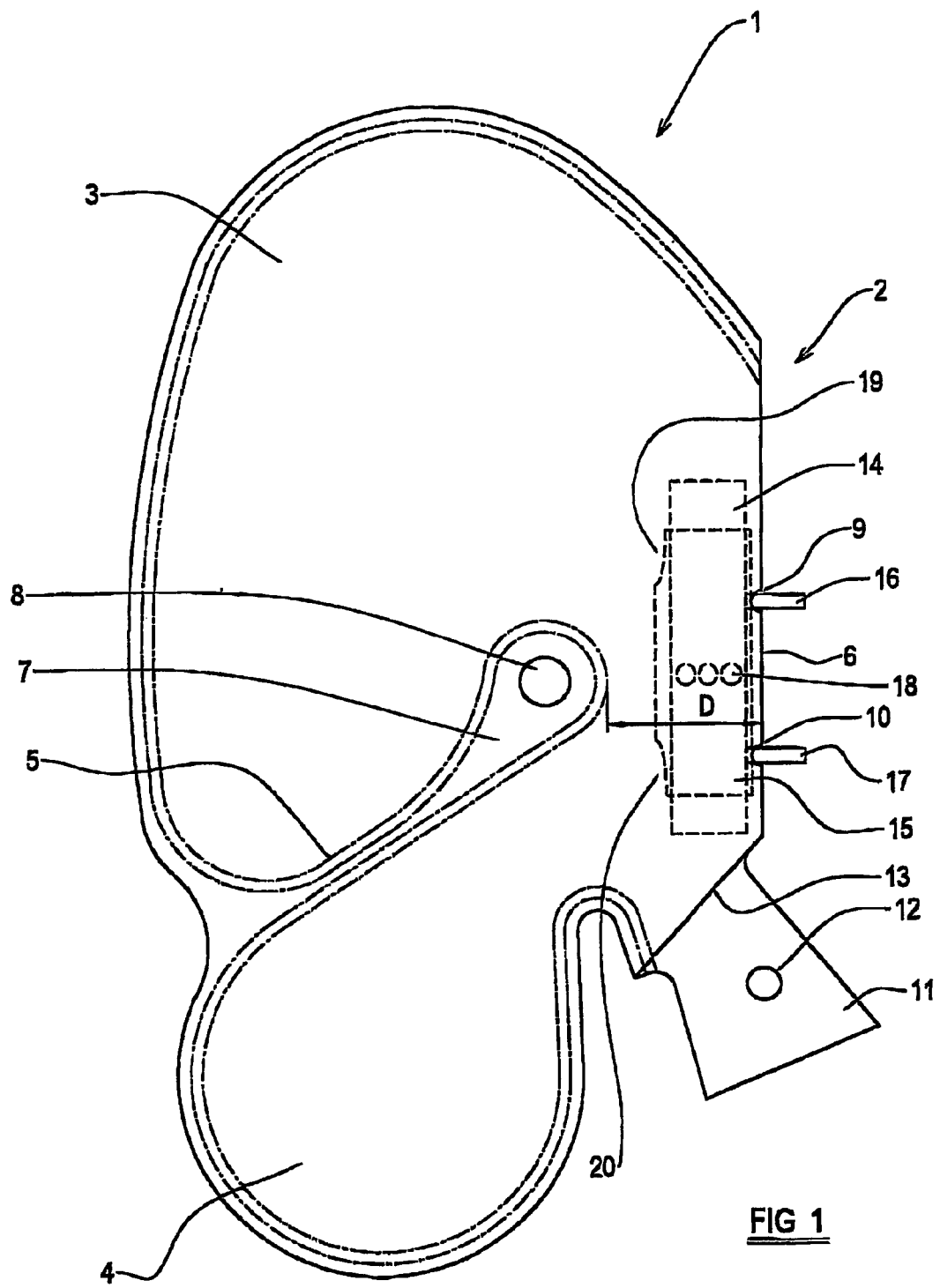
FIG. 1 is a diagrammatic view of an air-bag unit in accordance with the invention at an intermediate stage during fabrication.

Referring initially to FIG. 1 of the accompanying drawings, an air-bag 1 is illustrated. The air-bag 1 is a side air-bag to be positioned, when inflated, adjacent the side of an occupant of a vehicle. The air-bag 1 has a main inflatable region 2. The inflatable region is divided into an upper chamber 3 and a lower chamber 4 by means of a transversely-extending seam 5. The seam 5 is shown as extending with an upward inclination from the front of the air-bag 1 towards the rear part of the air-bag, but the seam could equally extend horizontally, in the manner of U.S. Pat. No. 6,349,964, which is hereby incorporated by reference.

The seam 5 extends part-way across the inflatable region 2 and terminates, in the condition of the air-bag as shown, a distance D from the rearmost part 6 of the air-bag. The seam 5 incorporates an uninflatable part 7 of the air-bag, the uninflatable part having an aperture 8 formed at the end of the seam closest to the rear part 6 of the air-bag. The rear part 6 of the air-bag is provided with two apertures 9 and 10 which are spaced apart and which are provided for a purpose which will be described hereinafter. The apertures 9 and 10 are spaced one above and one below the terminal part of the seam 5. At the base of the rearmost part 6 of the air-bag, a flap 11 is provided, which has a small aperture 12 formed therein, the aperture being associated with an opening 13 which provides access to the interior of the air-bag.

The opening 13 is sufficiently large to allow a cylindrical gas-generator 14 and an associated cylindrical gas-deflector 15 to be inserted into the air-bag through the opening 13. Here it is to be noted that the gas-generator is provided with two spaced-apart radially-extending mounting studs 16 and 17. Also it is to be noted the cylindrical gas-deflector 15 has an internal diameter slightly larger than the external diameter of the cylindrical gas-generator 14 and the deflector 15 surrounds part of the gas-generator 14 that has a plurality of gas outlet apertures 18. Each end of the cylindrical gas-deflector 15 is cut away to form two cut-outs 19 and 20 through which gas from the gas-generator may flow.

FIG. 1 shows the gas-generator 14 mounted in position within the air-bag 1 with the studs 16 and 17 passing through the apertures 9 and 10 formed in the back part 6 of the air-bag. It is to be noted that the distance D between the innermost end of the seam 5 and the back-part 6 of the air-bag is sufficient to enable the gas-generator to be moved relatively easily to the illustrated position.

Subsequent to positioning gas-generator 14 in air-bag 1, a strap 21 (shown in FIG. 2), is passed through the aperture 8 and wrapped around the rear-part 6 of the air-bag, thus totally encircling the gas-generator 14 and gas-deflector 15. The strap 21 is tightened and fastened, for example with an appropriate buckle, or possibly by stitching, with the strap firmly urging the terminal part of the seam 5 into contact with the exterior of the cylindrical gas-deflector at a point between the two cut-outs 19 and 20. The distance between the end of the seam 5 and the rear part 6 of the air-bag is now d, a distance less than D. As can be seen from FIG. 2, the cut-out 19 communicates with the upper chamber 3 and the cut-out 20 communicates with the lower chamber 4.

Once the strap 21 has been tightened, the flap 11 may be moved to close the opening 13, the small aperture 12 present in the flap 11 being mounted over the protruding end of the stud 17.

The gas-generator 14 is configured so that, on actuation of the gas-generator, gas at one pressure or volume will emerge through the cut-out 19 and gas at another pressure will emerge through the cut-out 20, thus enabling the chambers 3 and 4 to be inflated to different pressures. The chambers 3 and 4 are, of course, substantially sealed from each other. Eventually, gas from the chamber 3 or 4 at higher pressure will flow back through the gas-deflector into the chamber at lower pressure, but this will only occur some time after the air-bag 1 has been deployed.

It is to be understood that in modified embodiments the flap 11 and opening 13 may be replaced by a slit or an equivalent opening in one of the layers of fabric forming the air-bag 1 to enable the gas generator unit 14 to be introduced to the interior of the air-bag. This slit or opening could be sealed by the tightening strap 21.

Figure 2:
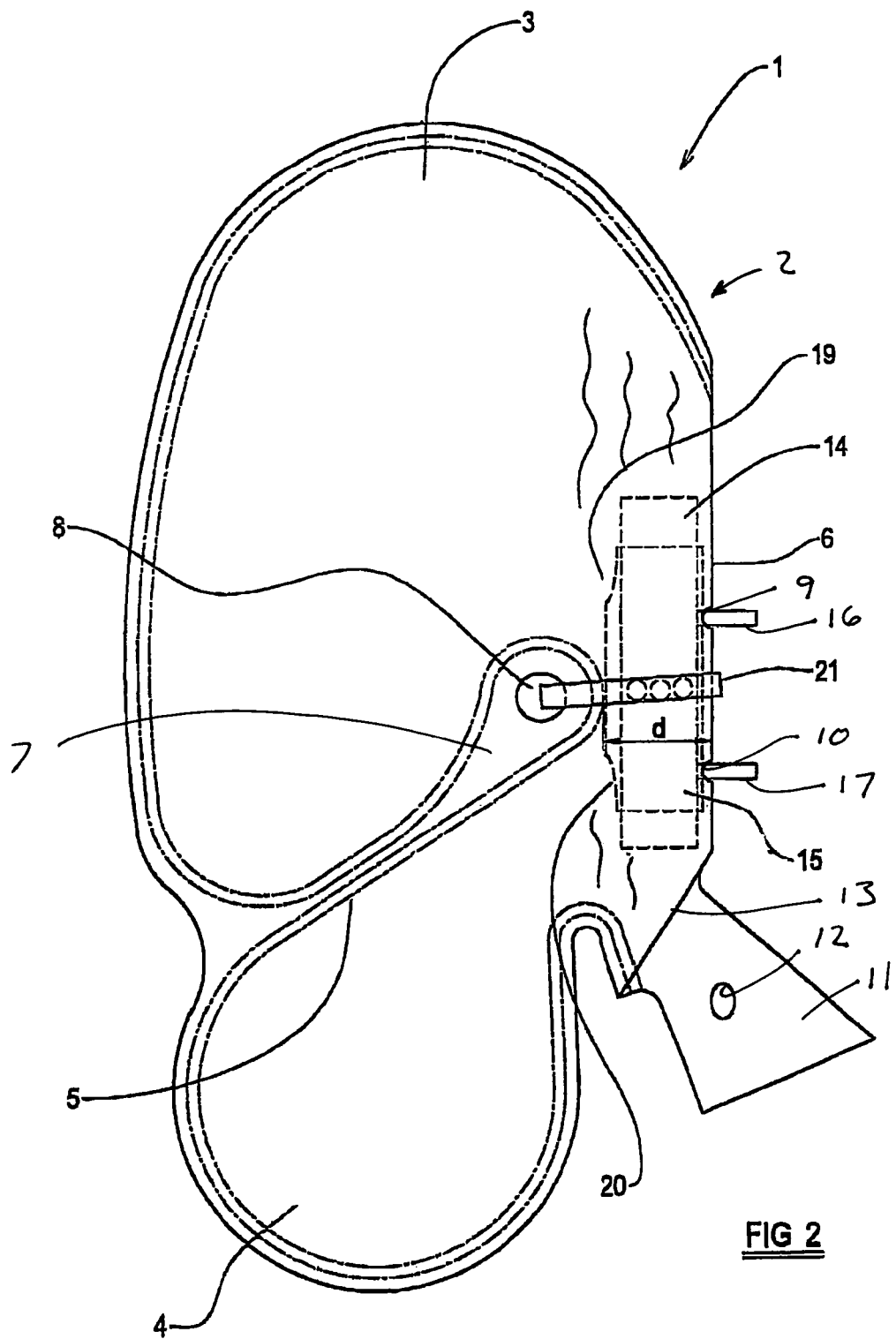
FIG. 2 is a view corresponding to FIG. 1 showing the air-bag at a subsequent stage during fabrication.
Figure 3:
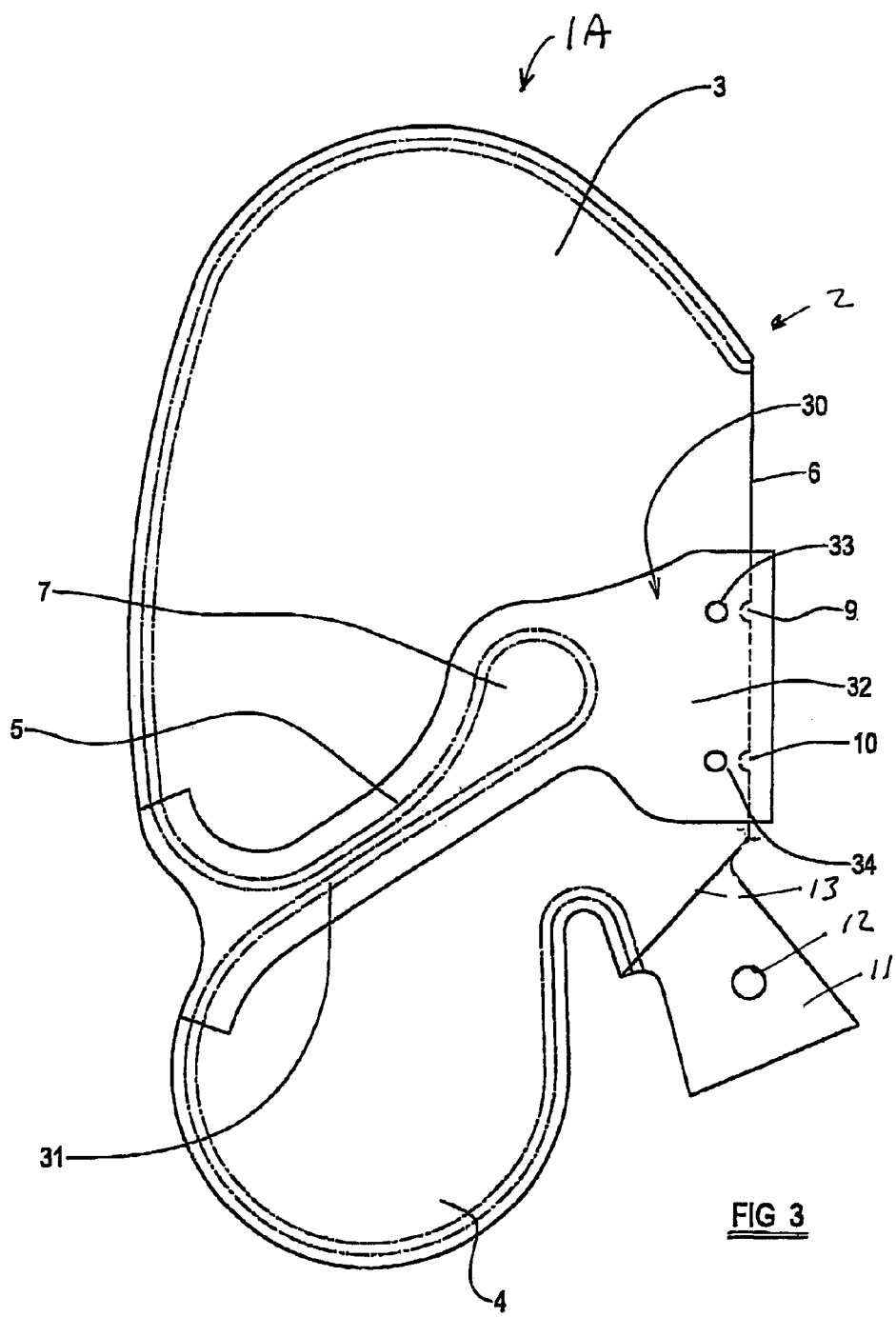
FIG. 3 is a view corresponding to FIG. 1 but showing a modified embodiment of the invention at a stage during fabrication of the air-bag.
Figure 4:
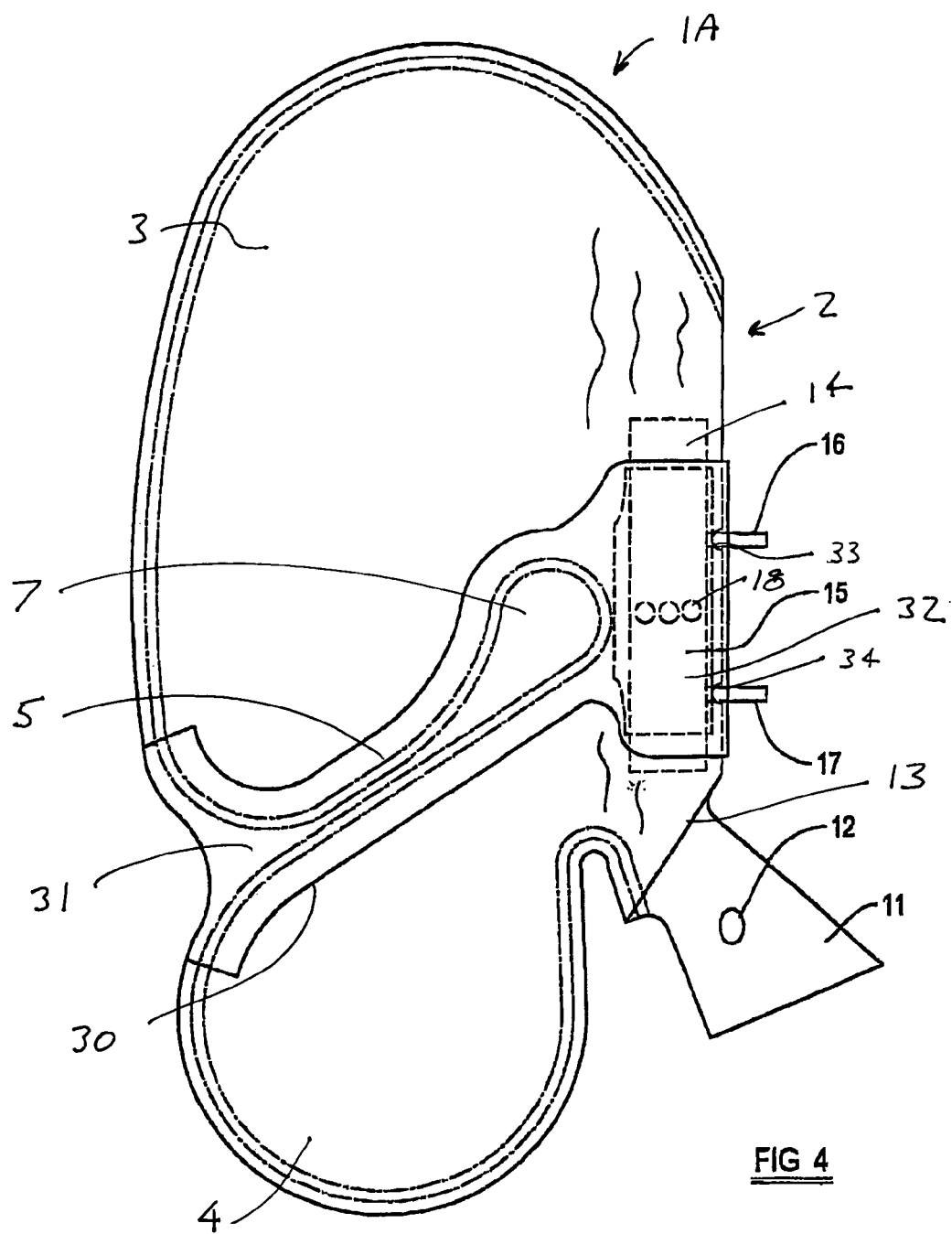
FIG. 4 is a view corresponding to FIG. 3 showing the air-bag in a subsequent stage during fabrication.

Whilst FIGS. 1 and 2 illustrate an embodiment in which an aperture 8 is formed in an uninflatable region 7 which forms part of a seam 5, FIGS. 3 and 4 illustrate a modified embodiment of the invention where two strap portions are stitched or otherwise secured to the exterior of the air-bag.

Referring now to FIG. 3, it will be observed that the basic air-bag 1A has a design which is directly equivalent to that of the air-bag 1 shown in FIGS. 1 and 2, save that there is no aperture 8 in the uninflatable region 7 formed at the end of the seam 5. However, a strap element 30 is provided which has a first region 31 which effectively overlies the seam 5. The region 31 will be secured to the body of the air-bag 1A in the region of the seam 5 and indeed, if the seam 5 is a stitched seam, the stitching forming the seam may pass through the element 30 which forms the strap to secure the strap to the air-bag.

The strap 30 incorporates a fastening region 32 which extends towards the rear part 6 of the air-bag, the fastening region 32 having two apertures 33 and 34 which are spaced apart by a distance equal to the spacing between the apertures 9 and 10 formed in the rear-most part 6 of the air-bag 1A. The fastening region 32 may have elastic properties, so that the region may be temporarily stretched. It is to be understood that optionally a similar, but mirror image, strap element is provided on the other side of the air-bag, that is to say the side not visible in FIG. 3. Thus a single strap or two strap elements may be used, depending on the dimensions of the air-bag and the gas generator unit.

The strap 30 illustrated in FIG. 3 is provided on the exterior of the air-bag. However, in an alternative embodiment the strap may be provided in the interior of the air-bag.

Referring now to FIG. 4, it is to be understood that once the gas-generator 15 has been mounted in position within the air-bag 1A, in a manner as described above with reference to FIG. 1, the fastening region 32 of the strap 30 will be pulled, stretching the region 32 until the apertures 33 and 34 will be engaged with the protruding studs 9 and 10 of the gas generator. As the fastening region 32 is released, the apertures 33 and 34 become firmly engaged with the studs 9 and 10 of the gas-generator. The strap 30 thus partially embraces the gas generator unit. Similarly, apertures in the fastening region of the other strap on the other side of the air-bag (if provided) will be connected to the studs 9 and 10. In a modified embodiment, the fastening region 31 of the one or more straps 30 may have a single aperture to engage with a single stud 9 and 10.

The configuration of the strap 30 is such that when the strap (or straps) has been fastened as described above, the innermost end of the seam 5 will be brought into engagement with the exterior of the cylindrical gas-deflector 15 associated with the gas-generator 14. Thus, again, a situation exists in which the cut-out 19 communicates with the chamber 3 whilst the cut-out 20 communicates with the chamber 4, there being no direct communication between the chambers. Again, the flap 11 will finally be moved so that the aperture 12 therein is engaged with the projecting stud 17 to seal the air-bag.

It is to be appreciated that in the embodiment of FIGS. 3 and 4, as in the embodiment of FIGS. 1 and 2, a strap, optionally formed from two strap parts which engage part of the seam 5 defining the discrete chambers within the inflatable region of the air-bag, at least partially embraces the gas-generator 14 and gas-deflector 15 to bring part of the seam into contact with the gas-deflector.

Whilst the invention has been described with reference to specific embodiments in which there are two discrete chambers 3 and 4 separated by a seam 5, with the seam being brought, by means of a strap, into engagement with the gas-deflector 15 provided on the gas-generator 14, it is to be understood that embodiments of the invention may be devised in which there are three chambers, divided by two spaced-apart seams, each seam being associated with an appropriate strap. Also, whilst the invention has been described with reference to a gas generator unit 14 having a cylindrical configuration and a tubular gas deflector, in alternative embodiments of the invention a cylindrical gas generator with gas outlets at opposite ends could be used, optionally with a "U" sectioned gas deflector to protect the rear part 6 of the air-bag from hot gas.

The term "strap" is used in this specification to include any elongate fastener, and includes a metal strap, such as a "JUBILEE"-type clip, or a cord or wire.

While the above description constitutes the preferred embodiment of the present invention, it will be appreciated that the invention is susceptible to modification, variation and change without departing from the proper scope and fair meaning of the accompanying claims.

The invention claimed is:

1. An air-bag comprising, the air-bag having an inflatable region, the inflatable region being separated into two chambers by a seam which extends substantially across the air-bag, a space being left between a termination of the seam and a part of the air-bag to accommodate a gas-generator unit, the space being dimensioned sufficiently to enable the gas-generator unit to be inserted into the space, a strap associated with the seam to embrace at least partially the gas-generator unit and to draw the seam termination toward the gas-generator unit.

2. An air-bag according to claim 1, wherein the gas-generator unit is a cylindrical unit provided with two protruding studs, the air-bag having two apertures to receive the studs.

3. An air-bag according to claim 1, wherein the gas-generator unit is a cylindrical unit and incorporating a tubular gas-deflector, the gas-deflector having gas outlets at each end thereof and being positioned within the air-bag so that gas from one end of the gas-deflector will enter one of the two chambers and gas from the other end of the gas-deflector will enter the other of the two chambers.

4. An air-bag according to claim 3 wherein the seam dividing the two chambers is provided with a seam aperture, the strap extending through the seam aperture and embracing the gas-generator unit.

5. An air-bag according to claim 1 wherein the strap is secured to the air-bag and partially embraces the gas generator unit.

6. An air-bag according to claim 5 wherein the strap is positioned in the interior of the air-bag.

7. An air-bag according to claim 5 wherein the strap is positioned on the exterior of the air-bag.

8. An air-bag according to any claim 1 wherein the strap is formed of two strap parts, each of the strap parts being secured to the air-bag, on a respective side of the air-bag, each strap part partially embracing the gas-generator unit.

9. An air-bag according to claim 1 wherein the strap is secured to the seam.

10. An air-bag according to claim 1 wherein the strap is provided with at least one aperture to be engaged with a protruding stud provided on the gas-generator and when the at least one aperture engages with the stud, the seam termination is drawn toward the gas-generator unit.

11. An air-bag according to claim 1, incorporating at least one further third chamber forming two pairs of chambers, each adjacent pair of chambers being separated by a respective seam, each seam having a respective strap associated with it.

* * * * *